United States Patent [19]

Howson et al.

[11] 3,951,722

[45] Apr. 20, 1976

[54] CONTACT ADHESIVES

[76] Inventors: John Charles Howson; Thomas Emsley Brooke, both of c/o Fort Dunlop, Erdington, Birmingham, England

[22] Filed: Nov. 9, 1973

[21] Appl. No.: 414,211

Related U.S. Application Data

[63] Continuation-in-part of Ser. No. 136,610, April 22, 1971, abandoned.

[30] Foreign Application Priority Data

Apr. 28, 1970 United Kingdom............... 20254/70

[52] U.S. Cl.................................. 156/307; 106/267; 156/308; 156/335; 156/333; 260/3.5; 260/23.7 H; 260/19 UA; 260/33.6 AQ; 260/19 N; 260/890

[51] Int. Cl.²........................................... C09J 5/02

[58] Field of Search........... 156/333, 307, 335, 308; 161/255; 260/23.7 H, 33.6 AQ, 890, 19 UA, 19 N, 3.5; 106/267

[56] References Cited

UNITED STATES PATENTS

| | | | |
|---|---|---|---|
| 2,455,855 | 12/1948 | Murphy et al. ............... | 260/890 X |
| 2,610,910 | 9/1952 | Thomsen ........................ | 156/335 |
| 2,637,706 | 5/1953 | Bergstrot et al. ............... | 260/19 UA |
| 2,673,838 | 3/1954 | Veatch et al. ................... | 252/29 |
| 2,838,463 | 6/1958 | Freeman ......................... | 260/3.5 |
| 3,144,428 | 8/1964 | Kost................................ | 156/333 |
| 3,308,087 | 3/1967 | Garrett ........................... | 156/333 X |
| 3,501,434 | 3/1970 | Chadwick et al. .............. | 260/33.6 AQ |
| 3,586,738 | 6/1971 | Weymann et al................ | 260/890 |
| 3,717,600 | 2/1973 | Salhuisw et al. ............... | 260/33.6 AQ |

FOREIGN PATENTS OR APPLICATIONS 1,031,768   6/1966   United Kingdom

OTHER PUBLICATIONS

"Anti-Settle C.V.P.", Cray Valley Products Ltd. Technical Data Sheet, (St. Mary Cray, Kent England), June 10, 1963.

*Primary Examiner*—Douglas J. Drummond
*Assistant Examiner*—J. J. Gallagher
*Attorney, Agent, or Firm*—Stevens, Davis, Miller & Mosher

[57] ABSTRACT

A one-part thixotropic contact adhesive composition comprises a polychloroprene in an organic liquid which is a solvent and/or dispersing medium for it, and from 1 to 10 parts by weight, per 100 parts by weight of the composition, of a thixotropic agent being a solid saturated hydroxy-carboxylic acid or a solid ester of a saturated hydroxy-carboxylic acid.

27 Claims, No Drawings

CONTACT ADHESIVES

This invention relates to adhesives and particularly to one-part thixotropic contact adhesives. This application is a continuation-in-part of application Ser. No. 136,610 filed Apr. 22, 1971 and now abandoned.

The term "contact adhesive" means an adhesive composition which, in use, is applied to the surfaces to be adhered and is allowed to dry, preferably to a substantially tack-free or touch-dry state, before the surfaces are brought together to effect a bond. The term "one-part adhesive" means an adhesive whose adherence depends on the loss of a liquid medium or carrier, and is distinguished from a "two-part adhesive" which consists of two separate components and which produces a bond by means of a chemical reaction between the two components or by one component catalyzing a chemical reaction in the other component. Generally, in a two-part adhesive system the components must be kept apart until the adhesive is required for use and the surfaces must be brought together soon after the adhesive has been applied. An example of a two-part adhesive is an epoxy resin adhesive in which one component comprises a liquid epoxy resin and a plasticizer which may be, for example, a particular type of polychloroprene, with or without minor ingredients, for example a thickener, and the other component comprises a substance which catalyzes the cure of the first component, for example a tertiary amine. A two-part adhesive is troublesome in that mixing together of the two components in the correct proportions is required and it is usually found that, owing to the low "green strength", i.e the initial bond strength, of the adhesive, the surfaces to be adhered must be clamped together until the curing reaction is complete.

One-part contact adhesives based on elastomers such as polychloroprene are known. However it is found that such adhesives are generally stringy during application and therefore do not easily cover the whole of the surfaces to be adhered, and that the adhesive-coated surfaces produce a bond immediately on contacting each other. We have found that the stringiness can be eliminated by the incorporation of a compound selected from a particular group of substances which act as thixotropic agents. Moreover we have found that other advantageous and surprising features may be achieved by means of this particular group of compounds. For instance, not only is the adhesive of this invention thixotropic, that is, it repeatedly thins when isothermally agitated and thickens when allowed to rest, but it can be a gel or paste at normal temperatures such that if its container is accidentally knocked over it does not spill out and yet it can be easily picked up by an applicator such as a brush or scraper, on which it is able to remain without dripping, and becomes an easy-to-apply fluid when applied by means of the applicator, so that it covers easily and evenly the surfaces to be adhered. Also, it is found that ingredients such as fillers and pigments may be included in the adhesive of this invention without the disadvantage of sedimentation (also called separation or phasing), i.e. the settling of ingredients such as fillers and pigments in the lower part of the adhesive composition in its container, which is often associated with previous polychloroprene contact adhesives. A further advantage of the present invention lies in the provision of thixotropic adhesives having a good coalescence, that is, a good ability of two tack-free coatings of the adhesive to coalesce when pressed into contact. Furthermore, adhesives of this invention may have the advantageous feature of "reposition ability", that is, the ability of the tack-free adhesive-coated surfaces to be brought into contact with each other and, provided no great pressure is applied, manoeuvred into the exact position desired before the bond is finally achieved by pressing the surfaces together. This is in sharp contrast to the usual contact adhesives which produce a bond as soon as the coated surfaces are brought into contact, relatively without pressure, thereby risking wastage and frustration if the surfaces were incorrectly positioned prior to contact.

However, it is emphasised that, in order to achieve these advantages, not any compound which is known to have a thixotropic effect will do. For instance we have found that known thixotropic agents such as mica, clay and silica do not result in these advantages. We have found that these advantages may be achieved by the use of a solid saturated hydroxy-carboxylic acid or a solid ester of a saturated hydroxy-carboxylic acid.

Therefore, according to the present invention, there is provided a one-part thixotropic contact adhesive composition comprising a polychloroprene in an organic liquid selected from the group consisting of organic liquid solvents and dispersing media for polychloroprene, and from 1 to 10 parts by weight, per 100 parts by weight of the composition, of a thixotropic agent being a compound selected from the group consisting of saturated hydroxy-carboxylic acids and esters of saturated hydroxy-carboxylic acids, which are solid at ambient temperatures.

According to the present invention also, a method of adhering two surfaces together comprises applying a one-part thixotropic contact adhesive composition as defined herein to the surfaces to be adhered, and bringing the surfaces into contact with each other after at least some of the organic liquid has evaporated.

Preferably the adhesive of this invention is non-fluid or gel-like in a state of rest at ambient temperatures. However, owing to its thixotropy it becomes fluid when agitated, for example by stirring or vibrating.

The polychloroprene may or may not be partly cross-linked and if desired a blend of polychloroprenes may be employed.

The organic liquid may be any of those which dissolve and/or disperse the polychloroprene. Often the polychloroprene may be partly dissolved and partly dispersed by the organic liquid.

Examples of suitable organic liquids are ketones, for example methyl ethyl ketone; esters, for example aliphatic esters such as ethyl acetate; and, preferably, aromatic hydrocarbons, for example toluene. If desired, a mixture of two or more liquids may be employed in order to achieve a compromise of features such as cost, aromaticity, toxicity, drying rate, viscosity and tack. Examples of suitable liquid mixtures are mixtures of any of the previously mentioned examples with each other and/or with, for example, one or more aliphatic hydrocarbons such as hexane, heptane or aliphatic fraction of petroleum, and/or one or more chlorinated hydrocarbons such as chloro-ethane. Preferably the organic liquid consists of or includes an aromatic hydrocarbon, for example toluene.

As stated hereinbefore, the group of compounds selected as thixotropic agents in this invention is very specific and consists of saturated hydroxy-carboxylic acids and esters of saturated hydroxy-carboxylic acids, the compounds being solid at ambient temperatures. Preferably the compounds are solid at a temperature in the range of 10°–70°C. The compounds generally have at least 12 carbon atoms in each acid carbon chain, for example from 12–24, or preferably from 16–20, carbon atoms in each acid carbon chain. It is to be understood that for a carbon chain to have a specified number of carbon atoms, the carbon to carbon bonds must be continuous, and thus the chain $-(CH_2)_n COO-(CH_2)_n-COOH$ would have two acid carbon chains having $n + 1$ carbon atoms in each chain, and not one chain having $2n + 2$ carbon atoms.

The compound employed as thixotropic agent may have one or more than one hydroxyl group and is suitably a hydroxy fatty acid, i.e. an acid having the formula $(HO)C_nH_{2n}(COOH)$, or a hydroxy fatty acid ester. A typical acid is hydroxy-stearic acid, especially 12-hydroxy-stearic acid. A suitable ester is one derived from a polyol, for example a diol such as ethylene glycol or propylene glycol, a tetrol, a pentitol or, preferably, a triol such as glycerol. A preferred ester is a glyceryl hydroxy-stearate.

Advantageously, the thixotropic agent may be made by hydrogenating an unsaturated hydroxy-carboxylic acid, for example ricinoleic, diricinoleic or ricinelaidic acid, or an ester thereof, especially a glyceryl ester. Hydrogenation should produce the corresponding fatty acid or ester. A preferred thixotropic agent may be made by hydrogenating the ester of glycerol and ricinoleic acid known as ricinolein. Hydrogenated castor oil is particularly preferred.

A preferred amount of thixotropic agent is in the range of from 1 to 3 parts by weight per 100 parts by weight of the composition.

Other ingredients may be included in the composition to confer or modify a property. Examples of additional ingredients are fillers, pigments, reinforcing polymeric materials such as chlorinated natural rubber, resins of hydrocarbyl-phenols and resin-modifying agents such as magnesium oxide. A suitable amount of reinforcing polymeric material would be up to 100 parts by weight per 100 parts by weight of polychloroprene in the composition.

If an improvement in cohesive strength and adhesion is desired, especially when the surfaces to be adhered are non-porous, it is often preferred to include a resin of a hydrocarbyl-phenol and formaldehyde in the composition. The resin may or may not be heat-reactive. Examples of hydrocarbyl-phenols are octyl, amyl and tertiary-butyl phenols and para-cresols. When a heat-reactive resin is employed it is preferred to employ a modifying agent such as magnesium oxide. The amount of magnesium oxide employed may be, for example, up to 20 parts by weight, and preferably in the range of from 3 to 10 parts by weight, per 100 parts by weight of polychloroprene in the composition. The weight ratio of magnesium oxide : resin may suitably be in the range 1:100 to 50:100 and is preferably in the range 5:100 to 40:100, especially in the range 5:100 to 20:100.

The adhesive composition may have a total solids content of from 10 to 70% by weight, preferably from 15 to 55% by weight and more preferably from 20 to 40% by weight.

The invention is illustrated by the following Examples in which all parts are parts by weight.

EXAMPLE I

An adhesive composition in accordance with the present invention was prepared from the following formulation:

|  | Parts |
| --- | --- |
| Polychloroprene | 25 |
| Toluene | 41 |
| Ethyl acetate | 11 |
| Aliphatic fraction of petroleum | 23 |
| Hydrogenated castor oil | 5 |

The polychloroprene (available as Neoprene AG) was made up into a 25 weight % solution in the blend of toluene, ethyl acetate and petroleum fraction (available as SBP2) and then the fully hydrogenated castor oil (available as Antisettle CVP or Armogel) was stirred in. The composition was stored at 50°C for 2 hours and then allowed to cool to room temperature.

The resulting composition was easy to apply by means of a notched scraper or brush, covering surfaces evenly and without stringiness, in contrast with many conventional one-part polychloroprene contact adhesives. It did not spill out of the container when it was tipped over and did not drip off the applicator.

The composition was useful for bonding porous surfaces together, for example, foam, upholstery material, canvas and other fabrics. A typical canvas/canvas bond strength was 28 lb after 3 days at room temperature, as measured by peeling apart a 1 inch wide strip of the canvas/canvas laminate at a rate of 6 inches per minute.

EXAMPLE II

Various organic liquids were employed in place of the particular blend of toluene, ethyl acetate and petroleum fraction in the formulation of Example I.

The following were found to be satisfactory:

|  | Parts | | | | |
| --- | --- | --- | --- | --- | --- |
| Toluene | 75 | 25 | 25 | 25 | 55 |
| Methyl ethyl ketone | 0 | 25 | 0 | 0 | 0 |
| Acetone | 0 | 0 | 25 | 0 | 0 |
| Ethyl acetate | 0 | 0 | 0 | 25 | 0 |
| Hexane | 0 | 25 | 25 | 25 | 20 |

These blends are those which are normally employed to produce polychloroprene solutions. The resulting adhesive compositions possessed the same advantages as that of Example I.

Methyl ethyl ketone alone and ethyl acetate alone were also found to be suitable organic liquids.

White spirit and water were unsuitable.

EXAMPLE III

A compositions was made up from the following formulation:

|  | Parts |
| --- | --- |
| Polychloroprene | 100 |
| Tertiary-butyl-phenol/formaldehyde resin | 74.5 |
| Magnesium oxide | 10 |
| Chlorinated natural rubber | 19.6 |
| Toluene | 151 |
| Ethyl acetate | 118 |

| | Parts |
|---|---|
| Aliphatic fraction of petroleum | 218 |

The polychloroprene and petroleum fraction were the same as employed in Example I. The chlorinated natural rubber was available as Alloprene N20.

The composition had a viscosity (Brookfield) of 325 cps making it too runny for brush-application.

However, when 21 parts (approximately 3% by weight) of hydrogenated castor oil (available as Antisettle CVP or Armogel) were incorporated into the composition the resulting composition possessed all of the advantages of the composition of Example I with the additional advantage of improved cohesive strength giving a strong bond between non-porous surfaces.

EXAMPLE IV

Compositions were made up from the following formulation:

| | Parts |
|---|---|
| Polychloroprene | 100 |
| Tertiary-butyl-phenol/formaldehyde resin | 45 |
| Magnesium oxide | 5 |
| Toluene | 250 |
| Ethyl acetate | 65 |
| Aliphatic fraction of petroleum spirit | 150 |

The polychloroprene and petroleum fraction were the same as those employed in Example I.

Various compounds known to act as thixotropic agents were each incorporated in concentrations of 1, 5, 10 and 25% by weight of the composition. The compositions were maintained at room temperature for 48 hours and their thixotropy was then noted. The compositions which were not thixotropic after this period were maintained at 40°C for about 16 hours (overnight) and then cooled to room temperature before their thixotropy was again noted. The results were as follows:

Mica: Non-thixotropic and sedimentation of mica at all concentrations, both after 48 hours at room temperature and after about 16 hours at 40°C.

Clay: Non-thixotropic and sedimentation of clay at all concentrations, both after 48 hours at room temperature and after about 16 hours at 40°C.

Silica: At 1%, 5% and 10% concentrations, slightly thixotropic owing to silica settling out, both after 48 hours at room temperature and after about 16 hours at 40°C. The viscosity of the compositions increased rapidly as the concentration of silica was increased such that at 10% concentration the composition was extremely viscous and it was found to be impossible to mix in as much as 25% silica owing to the high viscosity of the composition.

Glyceryl tri-(12-hydroxy-stearate): At 1% concentration, insignificantly thixotropic after 48 hours at room temperature but became thixotropic after about 16 hours at 40°C. At 5% concentration, thixotropic and only slightly fluid at rest after 48 hours at room temperature. At 10% concentration, very thixotropic and gel-like at rest after 48 hours at room temperature. At 25% concentration, very thixotropic after 48 hours at room temperature and not easy to convert the gel state into the fluid state owing to its high viscosity resulting from the high solids content.

The glyceryl tri-(12-hydroxystearate) was in the form of hydrogenated castor oil available as Antisettle CVP.

The coalescence of the compositions containing glyceryl tri-(12-hydroxystearate) and silica in 5% and 10% concentrations was compared as follows. Each composition was applied to a hardboard surface and a Formica (rigid plastic laminate based on phenol/formaldehyde resin) surface and the surfaces were pressed together after a period (open-joint time) of 25 minutes. The surfaces were then immediately pulled apart and the degree of coalescence of the coatings was noted.

At 5% concentration, the coalescence of the silica composition was about 5% and that of the glyceryl tri-(12-hydroxystearate) was about 60%. At 10% concentration the coalescence of the silica composition was about 5% and that of the glyceryl tri-(12-hydroxystearate) was about 40%.

EXAMPLE V

To the basic formulation given in Example IV, 60 parts (about 10%) of ground 12-hydroxystearic acid were added using a high speed stirrer. The resulting composition was stored at 35°C for 48 hours and then allowed to cool to room temperature.

This procedure was repeated four times using 60 parts of each of the following ingredients in place of the 12-hydroxystearic acid; viz. glyceryl monostearate, glyceryl tristearate, ricinoleic acid and castor oil. The first two of these ingredients are solid at room temperature and the second two are liquid at room temperature.

The composition containing 12-hydroxystearic acid was a highly thixotropic gel and could be applied by brushing or spreading to surfaces to be adhered. The composition containing glyceryl monostearate formed a very weak gel structure which was easily broken down and was not a satisfactory thioxotropic contact adhesive. The glyceryl tristearate, ricinoleic acid and castor oil did not produce thixotropic compositions.

Having now described our invention what we claim is:

1. A method of adhering two surfaces together which comprises applying to the surface to be adhered a one-part thixotropic contact adhesive composition consisting essentially of polychloroprene, an organic liquid selected from the group consisting of organic liquid solvents and dispersing media for polychloroprene, a hydrocarbyl-phenol/formaldehyde resin, and from 1 to 10 parts by weight, per 100 parts by weight of the composition of a thixotropic agent being a compound selected from the group consisting of saturated hydroxy-carboxylic acids and esters of saturated hydroxy-carboxylic acids, which are solid at ambient temperatures, and bringing the surfaces into contact with each other after at least some of the organic liquid has evaporated.

2. A one-part thixotropic contact adhesive composition consisting essentially of a polychloroprene in an organic liquid selected from the group consisting of organic liquid solvents and dispersing media for polychloroprene, a hydrocarbyl-phenol/formaldehyde resin, and from 1 to 10 parts by weight per 100 parts by weight of the composition of a thixotropic agent being a compound selected from the group consisting of saturated hydroxy-carboxylic acids and esters of saturated hydroxy-carboxylic acids, which are solid at ambient temperatures.

3. A composition according to claim 2 which is gel-like in a state of rest at ambient temperatures and which becomes fluid when agitated.

4. A composition according to claim 2 in which the thixotropic agent is solid at a temperature in the range of from 10° to 70°C.

5. A composition according to claim 2 in which the thixotropic agent has at least 12 carbon atoms in each acid carbon chain.

6. A composition according to claim 2 in which the thixotropic agent has from 12 to 24 carbon atoms in each acid carbon chain.

7. A composition according to claim 2 in which the thixotropic agent is a compound selected from the group consisting of hydroxy fatty acids and esters thereof.

8. A composition according to claim 2 in which the thixotropic agent is a hydroxy-stearic acid.

9. A composition according to claim 2 in which the thixotropic agent is 12-hydroxy-stearic acid.

10. A composition according to claim 2 in which the thixotropic agent is an ester derived from a polyol.

11. A composition according to claim 10 in which the polyol is a glycerol.

12. A composition according to claim 2 in which the thixotropic agent is a glyceryl hydroxy-stearate.

13. A composition according to claim 2 in which the thixotropic agent is the product of hydrogenating an unsaturated compound selected from the group consisting of unsaturated hydroxy-carboxylic acids and unsaturated hydroxy-carboxylic acid esters.

14. A composition according to claim 2 in which the thixotropic agent is the product of hydrogenating an ester of glycerol and ricinoleic acid.

15. A composition according to claim 2 in which the thixotropic agent is hydrogenated castor oil.

16. A composition according to claim 2 in which the thixotropic agent is employed in an amount of from 1 to 3 parts by weight per 100 parts by weight of the composition.

17. A composition according to claim 2 in which the organic liquid comprises an aromatic hydrocarbon.

18. A composition according to claim 17 in which the aromatic hydrocarbon is toluene.

19. A composition according to claim 2 in which the organic liquid comprises at least one liquid selected from the group consisting of ketones, esters and aromatic hydrocarbons.

20. A composition according to claim 19 in which the organic liquid comprises at least one of the liquids defined in claim 18 and at least one liquid selcted from the group consisting of aliphatic hydrocarbons and chlorinated hydrocabons.

21. A composition according to claim 2 which includes up to 100 parts by weight of chlorinated natural rubber per 100 parts by weight of chlorinated natural rubber per 100 parts by weight of polychloroprene.

22. A composition according to claim 2 which includes magnesium oxide and a heat-reactive hydrocarbyl-phenol/formaldehyde resin.

23. A composition according to claim 22 in which the weight ratio of magnesium oxide : resin is from 1:100 to 50:100.

24. A composition according to claim 22 in which the weight ratio of magnesium oxide : resin is from 5:100 to 40:100.

25. A composition according to claim 23 in which the amount of magnesium oxide employed is up to 20 parts by weight per 100 parts by weight of polychloroprene.

26. A composition according to claim 2 in which the hydrocarbyl-phenol is tertiary-butyl-phenol.

27. A composition according to claim 2 having a total solids content of from 10 to 70 per cent by weight.

* * * * *

UNITED STATES PATENT OFFICE
CERTIFICATE OF CORRECTION

PATENT NO. : 3,951,722
DATED : April 20, 1976
INVENTOR(S) : John Charles HOWSON et al.

It is certified that error appears in the above–identified patent and that said Letters Patent are hereby corrected as shown below:

Column 4, line 59, change "compositions" to -- composition --;

Column 8, line 17, change "18" to -- 19 --;

line 17, correct the spelling of "selected";

line 19, correct the spelling of "hydrocarbons";

line 22, delete this line in its entirety.

Signed and Sealed this

Sixth Day of July 1976

[SEAL]

Attest:

RUTH C. MASON
Attesting Officer

C. MARSHALL DANN
Commissioner of Patents and Trademarks